3,197,502
PROCESS FOR MAKING 2,6-DINITRO-m-TOLUIC ACID
Guy H. Harris, Concord, and Bryant C. Fischback, Walnut Creek, Calif., assignors to The Dow Chemical Company, Midland, Mich., a corporation of Delaware
No Drawing. Filed Nov. 14, 1960, Ser. No. 68,657
5 Claims. (Cl. 260—515)

The present invention relates to a method for the preparation of 2,6-dinitro-m-toluic acid. It relates in particular to a method of nitration of 2-nitro-m-toluic acid to form essentially pure 2,6-dinitro-m-toluic acid in high yield.

2,6-dinitro-m-toluic acid is useful as a starting material in the synthesis of other organic chemical compounds, e.g., methyl-2,6-dinitro-m-toluate and 2,6-dinitro-m-toluamide. The latter compound is particularly useful as a herbicide.

According to the teachings of the prior art relating to the nitration of aromatic compounds, the nitration of 2-nitro-m-toluic acid should result in a mixture containing comparable proportions of 2,4-dinitro-m-toluic acid and 2,6-dinitro-m-toluic acid. The recovery of the desired 2,6-dinitro compound from such a mixture would be difficult, time-consuming and costly. The problem of producing essentially pure 2,6-dinitro-m-toluic acid would be even greater because such position isomers are notoriously difficult to separate, one from the other, with any degree of completeness.

It is therefore an object of the present invention to provide a method for the preparation of 2,6-dinitro-m-toluic acid. Another object is the provision of a method for the nitration of 2-nitro-m-toluic acid that results in the preparation of essentially pure 2,6-dinitro-m-toluic acid and that meanwhile minimizes the simultaneous production of 2,4-dinitro-m-toluic acid. Other objects will appear hereinafter.

According to the present invention, the above and other desirable objects are attained by the method which comprises reacting 2-nitro-m-toluic acid with at least an equimolar amount of a nitrating agent while the acid is in solution in sulfuric acid and thereafter recovering 2,6-dinitro-m-toluic acid from the reaction mixture.

In carrying out the invention, any of a number of nitrating agents may be used. For example, nitric acid at concentrations of from 67 to 100 percent by weight may be employed including the fuming grades of nitric acid, as well as other nitrating agents such as ethyl nitrate, potassium nitrate, etc. It is preferred to use the commercial, 90 percent grade of fuming nitric acid. A quantity of nitrating agent equivalent to at least one mole of $HNO_3$ is required for each mole of 2-nitro-m-toluic acid to be nitrated. From about 1.2 to 1.5 moles are preferred in order to provide nearly complete reaction. Quantities of nitrating agent equivalent to greater than 1.5 moles of $HNO_3$ per mole of 2-nitro-m-toluic acid are not particularly effective in increasing the yield.

As indicated, the reaction takes place when the 2-nitro-m-toluic acid is in solution in the sulfuric acid or in the mixture of sulfuric acid and nitrating agent. Two factors affect this situation; the quantity of sulfuric acid present and the temperature of the reaction mixture. Temperatures in the range of from about 10° C. to about 125° C. may be employed. At the lower temperatures, extended times, as much as several hours, may be required for the reaction to go essentially to completion. At the upper end of the stated range, the product tends to be degraded. A temperature range of from 25° to 100° C. is more suitable and from about 30° to about 80° C. is preferred. Sulfuric acid of the grades normally referred to as "concentrated" are preferred. Sufficient sulfuric acid, from 90 to 98 percent or higher concentration by weight must be present to provide a solvent for the raw material. An amount of sulfuric acid of at least about four times the weight of 2-nitro-m-toluic acid to be nitrated is usually required, and it is preferred to use about 9 to 10 times this weight.

As indicated, the time of reaction will vary with the reaction temperature. At the preferred temperature, about one hour reaction time is sufficient. The order of addition of reagents is not critical. For example, the sulfuric acid and nitrating agent may be combined and the 2-nitro-m-toluic acid added thereto or, alternatively, the 2-nitro-m-toluic acid may be dissolved in the sulfuric acid and the nitrating agent added to the solution. The reaction is carried out at atmospheric pressure and no critical effect of varying pressure has been observed.

Following the reaction, the mixture is preferably cooled to about 20° C., at which temperature nearly all the desired 2,6-dinitro-m-toluic acid precipitates from the mixture in pure form. The product may be recovered by centrifugation, decantation, or preferably by filtration. When washed free of the reaction medium and dried, this product is essentially pure, i.e., greater than 99 percent, 2,6-dinitro-m-toluic acid. If desired, a further crop of product may be obtained by diluting the reaction mixture, as by pouring it into ice-water. In this instance, the remainder of the desired product precipitates together with the minor amount of 2,4-dinitro-m-toluic acid that is formed.

The yield is increased by diluting the reaction mixture so that all of the product precipitates as described above; however, some contamination occurs. Both the yield and the purity of the product may be maximized by using the minimum amount of sulfuric acid to dissolve the starting 2-nitro-m-toluic acid.

The invention is further illustrated by the following example in which all proportions are given by weight, unless otherwise stated:

A mixture of 15.5 ml. (0.332 mole) of 90 percent nitric acid and 200 ml. of 96 percent sulfuric acid was prepared at 36° C. To this mixture there was added quickly 40 grams (0.221 mole) of 2-nitro-m-toluic acid. The latter dissolved slowly while the temperature rose to 52° C. During dissolution and subsequent, thereto, a solid crystalline product precipitated from the reaction mixture. The mixture was stirred and held at about 52° C. by means of external heating for about one hour. The mixture was then cooled to 20° C. and the solid product was removed by filtration. The product was washed first with sulfuric acid and then with ice water and then dried in air. There was thus obtained 30.2 grams of 2,6-dinitro-m-toluic acid melting at 178.5–179.5° C. (corr.). This is equivalent to a yield of 60.4 percent based on the 2-nitro-m-toluic acid starting material. This product was found by infra-red analysis to be substantially pure, i.e., greater than 99 percent, 2,6-dinitro-m-toluic acid.

The filtrate obtained in the above manner was poured over flaked ice, thus forming an additional amount of crystalline product. After recovery by filtration, washing, and drying, as above, this crop of product was found to amount to 11.6 grams and to contain 86.3 percent 2,6-dinitro-m-toluic acid and 13.7 percent 2,4-dinitro-m-toluic acid.

We claim:
1. A method of preparing 2,6-dinitro-m-toluic acid which comprises nitrating an organic reactant consisting essentially of 2-nitro-m-toluic acid with a nitrating agent while said acid is in solution in sulfuric acid, and then recovering 2,6-dinitro-m-toluic acid from the reaction mixture.

2. The method of claim 1 in which the nitrating agent is a nitric acid solution in water of at least 67 percent by weight concentration, and is present in an amount equivalent to from 1.0 to 1.5 moles of nitric acid per mole of 2-nitro-m-toluic acid.

3. The method of claim 2 in which the 2-nitro-m-toluic acid is dissolved in from about 4 to about 10 times its own weight of sulfuric acid.

4. The method of claim 2 in which the reaction is carried out between about 25° and 100° C.

5. A method of preparing 2,6-dinitro-m-toluic acid which comprises nitrating an organic reactant consisting essentially of 2-nitro-m-toluic acid, while the latter is in solution in from about 9 to about 10 times its own weight of concentrated sulfuric acid, with from about 1.2 to about 1.5 moles of nitric acid per mole of said 2-nitro-m-toluic acid, said nitric acid being employed as a 90 percent solution in water, said reaction being carried out at a temperature of from about 30° to about 80° C., cooling the reaction mixture to about 20° C. and recovering the 2,6-dinitro-m-toluic which precipitates from the reaction mixture.

References Cited by the Examiner

Blatt: "J. Org. Chem.," vol. 25, pp. 2030–2034, Nov. 7, 1960.

France: "Chemical Abstracts," vol. 52, pp. 17254–17255, September-October 1958.

Groggins: "Unit Processes in Organic Synthesis," 5th edition, page 66 (1958).

LORRAINE A. WEINBERGER, *Primary Examiner.*

CHARLES B. PARKER, *Examiner.*